United States Patent
Wei (10) Patent No.: US 8,523,952 B2
(45) Date of Patent: Sep. 3, 2013

(54) PROTECTION METHOD FOR USE IN PORTABLE COMMUNICATION DEVICE

(75) Inventor: Jr-Rung Wei, Taipei (TW)

(73) Assignee: Acer Inc., Hsichih, Taipei (TW)

( * ) Notice: Subject to any disclaimer, the term of this patent is extended or adjusted under 35 U.S.C. 154(b) by 1338 days.

(21) Appl. No.: 11/555,473

(22) Filed: Nov. 1, 2006

(65) Prior Publication Data

US 2008/0022418 A1    Jan. 24, 2008

(30) Foreign Application Priority Data

Jul. 21, 2006    (CN) .......................... 2006 1 0107806

(51) Int. Cl.
- G06F 1/26 (2006.01)
- G06F 11/00 (2006.01)
- G08B 13/00 (2006.01)
- G08B 21/00 (2006.01)
- G08B 29/00 (2006.01)
- H04M 1/66 (2006.01)
- H04M 1/68 (2006.01)
- H04M 3/16 (2006.01)

(52) U.S. Cl.
USPC ............... 726/35; 726/34; 380/270; 455/410

(58) Field of Classification Search
USPC ............................................ 726/35; 380/270
See application file for complete search history.

(56) References Cited

U.S. PATENT DOCUMENTS

| | | | |
|---|---|---|---|
| 2002/0183059 A1* | 12/2002 | Noreen et al. | 455/427 |
| 2006/0005033 A1* | 1/2006 | Wood | 713/182 |
| 2006/0058951 A1* | 3/2006 | Cooper et al. | 701/208 |
| 2007/0056043 A1* | 3/2007 | Onyon et al. | 726/26 |

\* cited by examiner

*Primary Examiner* — Edan Orgad
*Assistant Examiner* — Jahangir Kabir
(74) *Attorney, Agent, or Firm* — Winston Hsu; Scott Margo (57) ABSTRACT

A protection method is used in a portable communication device. The protection method comprises the steps of generating a specific command, and storing the specific command into the portable communication device; the portable communication device waiting and receiving a message; determining whether the message received by the portable communication device comprises the specific command; and performing a protection mechanism for protecting the important information contained in the portable communication device when the message comprises the specific command.

24 Claims, 11 Drawing Sheets

PROTECTION METHOD FOR USE IN PORTABLE COMMUNICATION DEVICE

FIELD OF THE INVENTION

The present invention relates to a protection method, and more particularly to a protection method used in a portable communication device for preventing the important information included in the portable communication device from being revealed if the portable communication device is stolen or lost.

BACKGROUND OF THE INVENTION

Nowadays, wireless communication technologies have experienced great growth and are rapidly gaining in popularity. In addition, portable communication devices such as mobile phones, personal digital assistants (PDAs) and notebook computers become popular in modern societies due to some advantages such as small size, light weightiness and easy portability. On account of their portability, the users can use these portable communication devices everywhere they are.

For communication and data storage, the widely-used, secret and/or important information may have been previously stored in the portable communication device. The secret and/or important information is included in for example address books, calendars, meeting record or electronic mails. If the portable communication device is stolen or lost, the information stored therein becomes unprotected at all. In other words, any unauthorized user can easily access to the data in the portable communication device.

In views of the above-described disadvantages resulted from the prior art, the applicant keeps on carving unflaggingly to develop a protection method for use in a portable communication device according to the present invention through wholehearted experience and research.

SUMMARY OF THE INVENTION

It is an object of the present invention to provide a protection method for use in a portable communication device in order to implement data security with high reliability, thereby preventing the important information included in the portable communication device from being revealed if the portable communication device is stolen or lost.

In accordance with an aspect of the present invention, there is provided a protection method used in a portable communication device. The protection method includes the steps of generating a specific command, and storing the specific command into the portable communication device; the portable communication device waiting and receiving a message; determining whether the message received by the portable communication device comprises the specific command; and performing a protection mechanism for protecting the important information contained in the portable communication device from being revealed when the message comprises the specific command.

In accordance with another aspect of the present invention, there is provided a portable communication device having data protecting function. The portable communication device comprises a storing device, a transceiver unit and a control unit. The storing device stores therein a specific command. The transceiver unit is used for receiving a message. The control unit is used for determining whether the message received by the portable communication device comprises the specific command, and performing a protection mechanism for protecting the important information contained in the portable communication device from being revealed if the message comprises the specific command.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
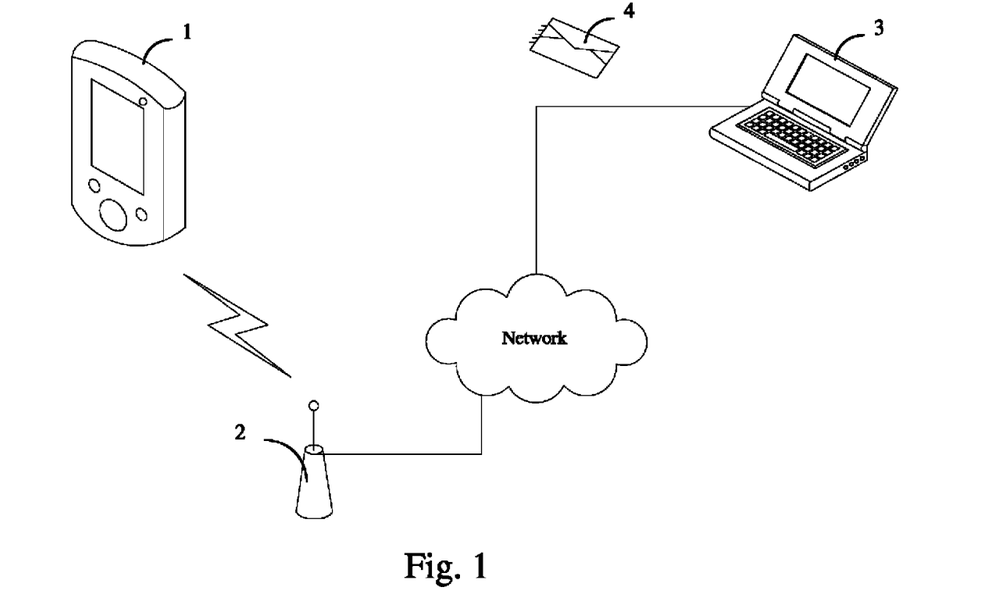
FIG. 1 is a schematic configuration of a data security system according to the present invention.

Referring to FIG. 1, a schematic configuration of a data security system according to the present invention is illustrated. The data security system of FIG. 1 comprises a portable communication device 1, a message transmission system 2 and a designated communication device 3. An exemplary portable communication device 1 includes a mobile phone, a personal digital assistant (PDA) and a notebook computer having a wireless communication module. Some important or secret data such as address books, calendars, meeting record, electronic mails or personal video data have been stored in the portable communication device 1. An exemplary message transmission system 2 includes base station. The message transmission system 2 is interconnected between the portable communication device 1 and the designated communication device 3. Through the message transmission system 2, the portable communication device 1 is communicated with the designated communication device 3, such that the designated communication device 3 may send a message 4, for example a short message, to the portable communication device 1. An example of the designated communication device 3 includes but is not limited to a mobile phone, a personal digital assistant (PDA), a notebook computer having a wireless communication module, a combination of a mobile phone and a notebook computer having IR transmission modules, or a notebook computer/desktop computer linked to a network. For example, if the designated communication device 3 is a mobile phone, the message 4 can be directly edited by the mobile phone. If the designated communication device 3 is a notebook computer or desktop computer, the designated communication device 3 may be linked to for example the short message service website to send the message 4. Alternatively, if the designated communication device 3 is a combination of a mobile phone and a notebook computer having IR transmission modules, the message 4 is edited by the notebook computer and sent from the mobile phone. For clarification, a notebook computer is shown in FIG. 1 as the designated communication device 3, which is linked to the network.

Figure 2:
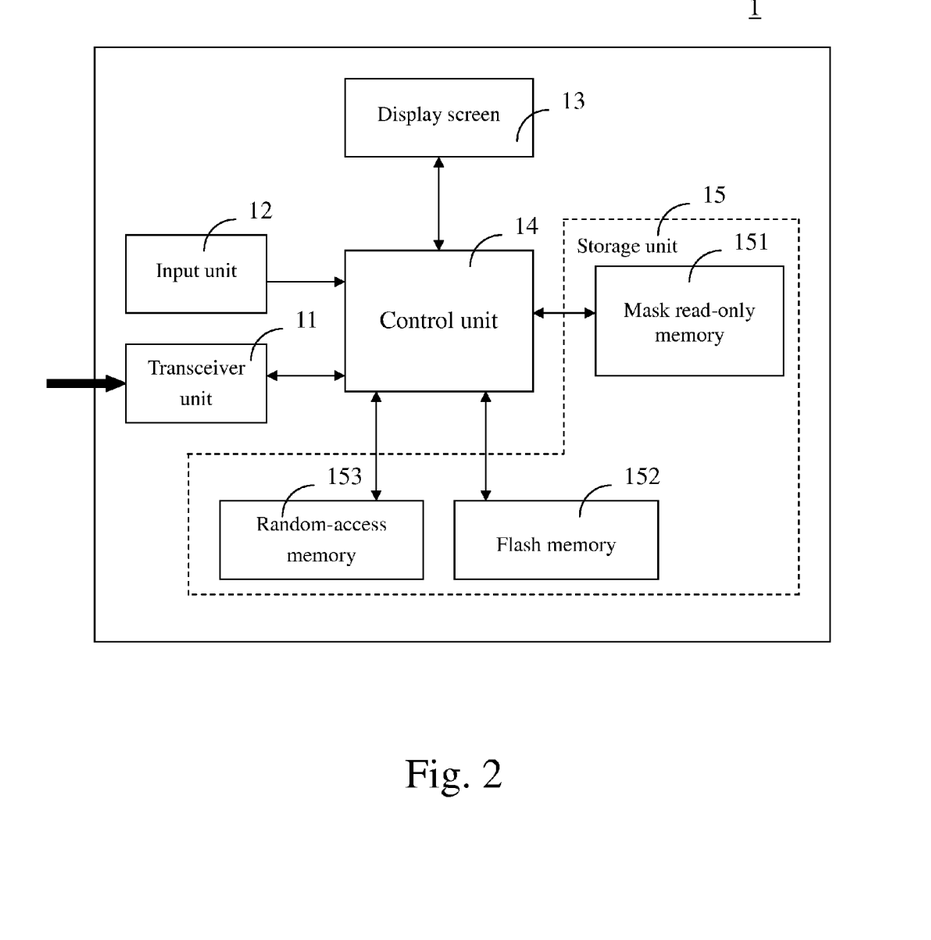
FIG. 2 is a schematic circuit block diagram of a portable communication device used in the data security system of the present invention.

Referring to FIG. 2, a schematic circuit block diagram of a portable communication device used in the data security system of the present invention is illustrated. The portable communication device 1 comprises a transceiver unit 11, an input unit 12, a display screen 13, a control unit 14 such as a central processing unit (CPU) and a storage unit 15. The storage unit 15 includes a mask read-only memory 151, a flash memory 152 and/or a random-access memory 153. The wireless signals from the message transmission system 2 can be received by the transceiver unit 11 of the portable communication device 1. Likewise, wireless signals can be transmitted from the portable communication device 1 to the message transmission system 2 via the transceiver unit 11. The control unit 14 is electrically connected to the transceiver unit 11 for receiving, processing and/or generating information and messages. The input unit 12 is electrically connected to the control unit 14 for inputting information and messages therevia. The display screen 13 is electrically connected to the control unit 14 for displaying the information and messages thereon. The storage unit 15 is electrically connected to the control unit 14 for storing therein a systematic program, a protective program or other important information.

Figure 3:
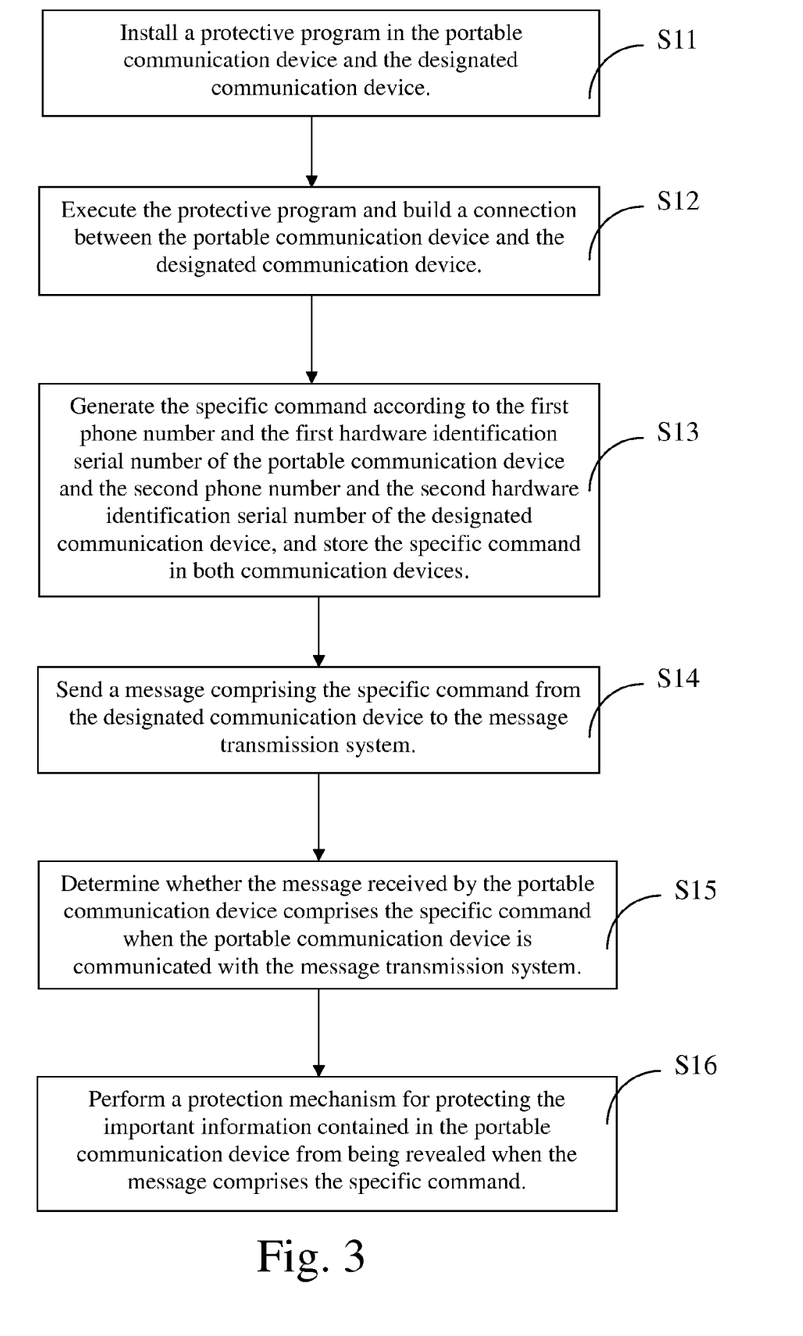
FIG. 3 is a flowchart of a protection method for use in the portable communication device.
Figure 4:
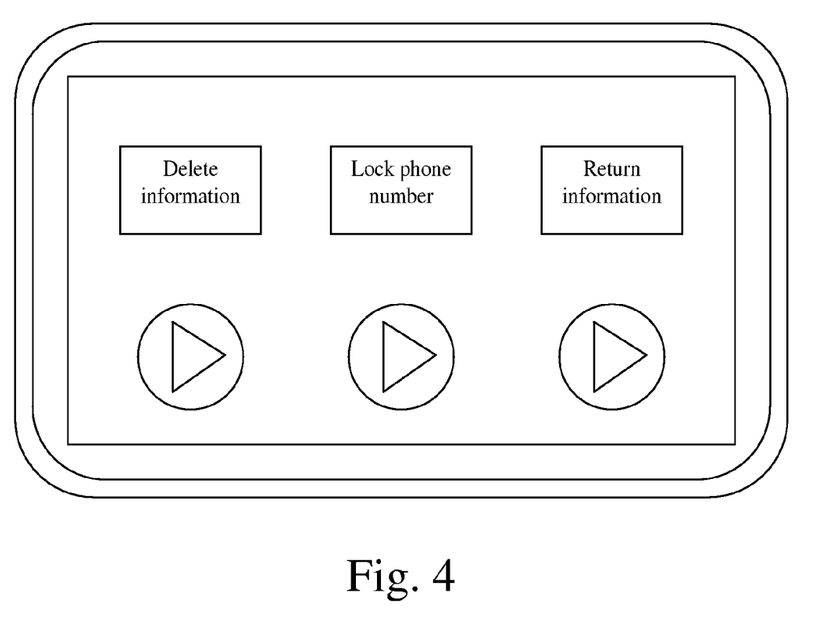
FIG. 4 is a schematic view illustrating a user operation interface shown on the designated communication device.

Hereinafter, a flowchart of a protection method for use in a portable communication device will be illustrated with reference to FIG. 3 and also FIGS. 1 and 2. First of all, in the step S11, a protective program is installed in each of the portable communication device 1 and the designated communication device 3, so that the protective program is stored in the storage unit 15 of the portable communication device 1 and the storage unit of the designated communication device 3. Alternatively, each of the portable communication device 1 and the designated communication device 3 has a built-in protective program. Next, in step S12, the protective program is executed and the portable communication device 1 is communicated with the designated communication device 3. By the transceiver unit 11, the portable communication device 1 may build a wireless connection with the designated communication device 3. In addition, a user operation interface is shown on the display screen 13 of the portable communication device 1 or the display screen of the designated communication device 3. An exemplary user operation interface is illustrated in FIG. 4. Via the user operation interface of the portable communication device 1, the user can select or set protection mechanisms of for example deleting information, locking phone number and/or delivering information associated with data security. Then, when a selective item is actuated, a first phone number and a first hardware identification serial number of the portable communication device 1 are retrieved and a second phone number and a second hardware identification serial number of the designated communication device 3 are retrieved (step S13). By using a specific algorithm such as Message-Digest algorithm 5 (MD5), the first phone number and the first hardware identification serial number are encoded as a first command "A", and then the second phone number and the second hardware identification serial number are encoded as a second command "B". The first command "A" and the second command "B" are then combined as a specific command, which is stored into the portable communication device 1 and the designated communication device 3. According to the specific command, it is determined whether the protection mechanism applied between the portable communication device 1 and the designated communication device 3 should be performed or not.

Figure 5:
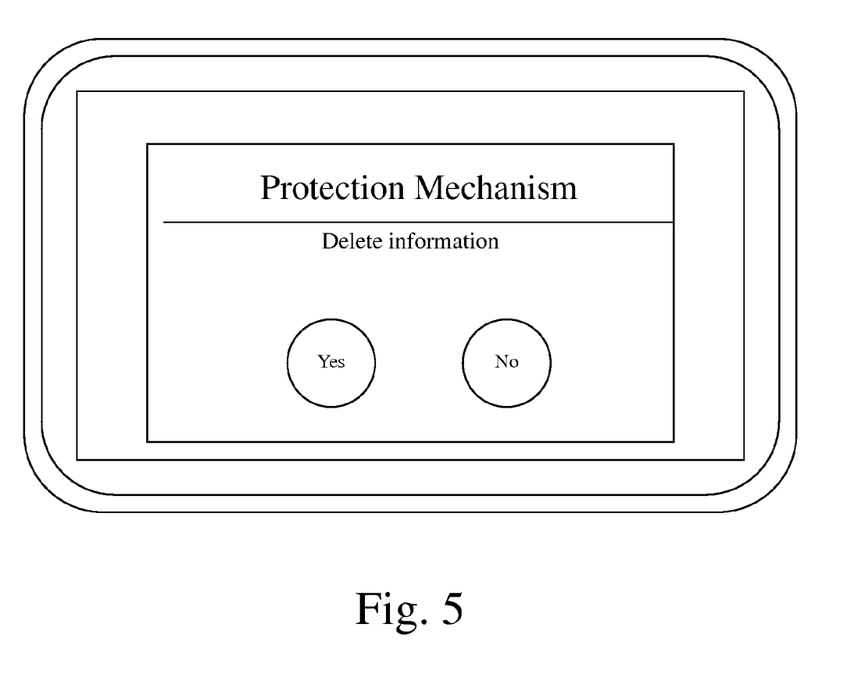
FIG. 5 is a schematic view illustrating another user operation interface shown on the designated communication device.

In a case that the portable communication device 1 is stolen or lost, the protective program can be executed via the user operation interface of the designated communication device 3. An exemplary user operation interface of the designated communication device 3 is illustrated in FIG. 5. Via the user operation interface of the designated communication device 3, the user may decide whether the protection mechanisms should be done. If the user executes the protection mechanisms by inputting an instruction via the user operation interface, the designated communication device 3 will send a message comprising the specific command to the message transmission system 2 (step S14). If the portable communication device 1 is powered on and communicated with the message transmission system 2, the portable communication device 1 may receive messages and determine whether any message comprises the specific command (step S15). If the specific command is contained in any message, the control unit 14 may perform the protection mechanism. The protection mechanism includes for example deletion of the secret and/or important information stored in the storage unit 15. These data are included in for example the address books, calendars, meeting record, electronic mails or video data files. It is of course that the protection mechanism may further include locking phone number, returning information, showing a warning text prompt or showing the way of communicating with the owner. Otherwise, if no specific command is contained in any message, the contents of the messages will be shown on the display screen 13.

An embodiment of generating the specific command will be illustrated as follows. For example, the portable communication device 1 is a mobile phone having a first phone number "0937111222" and a first hardware identification serial number "HGHYA123D123F23GBvTKJHUF". By using a specific algorithm such as Message-Digest algorithm 5 (MD5), the first phone number and the first hardware identification serial number are encoded as a first command "A", i.e. MD5Hash (0937111222HGHYA123D123F23GBvTKJHUF)= xxxxxxxxxxxxxxxx, and the first command "A"= (xxxxxxxxxxxxxxxx).

Likewise, the designated communication device 3 is another mobile phone having a second phone number "0937000123" and a second hardware identification serial number "AA00AABBCC11". By using the Message-Digest algorithm 5 (MD5), the second phone number and the second hardware identification serial number are encoded as a second command "B", i.e. MD5Hash(0937000123 AA00AABBCC11)=yyyyyyyyyyyyyyyy, and the second command "B"=(yyyyyyyyyyyyyyyy).

Next, the first command "A" and the second command "B" are combined as the specific command (the first command "A", the second command "B": xxxxxxxxxxxxxxxx, yyyyyyyyyyyyyyyy). The specific command is then stored into the storage units of the portable communication device 1 and the designated communication device 3.

In some embodiments, the message is a short message provided by a short message service (SMS) or a multimedia messaging service (MMS). As known, the short message service (SMS) is applied between the mobile phones, facsimile machines and/or IP addresses in the GSM (Global System for Mobile Communication) network system for transmitting short text messages less than 160 characters. However, the information to be transmitted by the short message service (SMS) excludes image or graphic information. The short message service (SMS) is advantageous of having a rapid transmission speed and a high reliability. The short message provided by the short message service (SMS) is guaranteed to reach the receiver. Generally, once a short message is sent, the short message service center (SMSC) immediately receives the short message. Meanwhile, the short message service center (SMSC) sends a SMS request to the home location register (HLR) of the message transmission system 2 for example base station. In response to the SMS request, the home location register (HLR) sends the using status information (including for example powered on/off status and a wander position) to the short message service center (SMSC). In a case that the using status information indicates the portable communication device 1 is powered off, the short message service center (SMSC) will retain the short message for a period of time. In a case that the portable communication device 1 is communicated with the message transmission system 2, the home location register (HLR) will transmit a SMS notice to the short message service center (SMSC). In response to the SMS notice, the short message service center (SMSC) will try to transmit the short message to the message transmission system 2. Under this circumstance, the GSM network system will search the portable communication device 1 and then transmit the short message to the portable communication device 1. Afterwards, a verification message is received by the short message service center (SMSC) to indicate that the short message has been received by the user. Meanwhile, this short message is marked as a transmitted short message, which needs not be transmitted.

The multimedia messaging service (MMS) is an advanced version of the short message service (SMS) for transmitting, receiving and editing multimedia contents such as video data and image data. In replace of use in the basic network, the multimedia messaging service (MMS) can be applied to the advanced generation (2G, 2.5G and 3G) of wireless network, e.g. GSM, GPRS and WCDMA. A MMS Relay/Server is a network entity or application which is controlled by the MMS provider. This entity transfers messages, provides specific operations to the mobile environment and provides storage services. As a consequence, by the multimedia messaging service (MMS), the information previously stored in the portable communication device 1 can be transmitted to the designated communication device 3 to retrieve the important information.

In some embodiments, a predetermined password has been previously recorded in the storage unit 15. Via the input unit 12, the user may input an input password. In a case that the portable communication device 1 is stolen or lost and the subscriber identity module (SIM) card is replaced with a new one, the control unit 14 will actuate the password verification function. Meanwhile, the control unit 14 will compare the input password with the predetermined password. If the input password is inconsistent with the predetermined password, the control unit 14 performs a protection mechanism for preventing the important information contained in the portable communication device 1 from being revealed.

Figure 6:
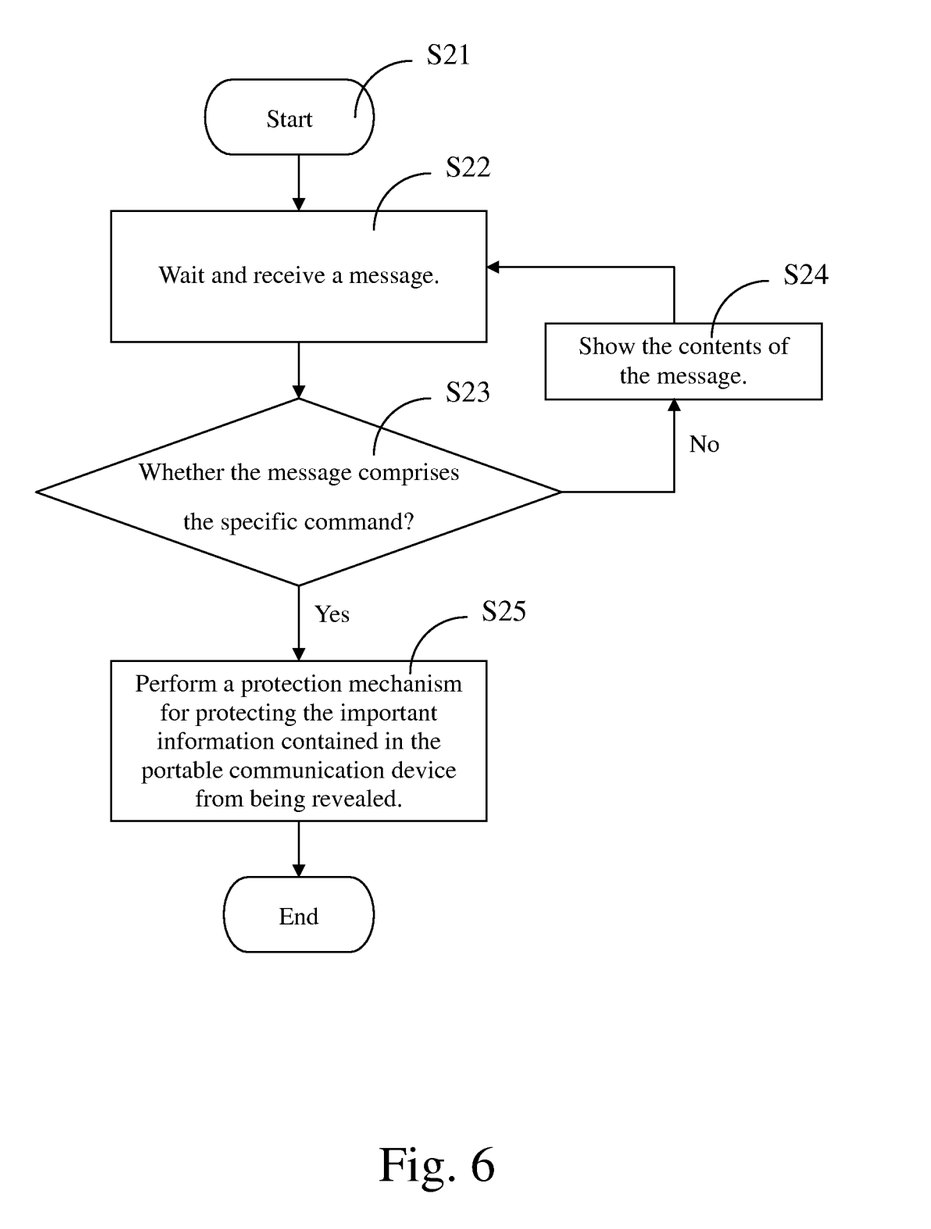
FIG. 6 is a flowchart of another protection method for use in a portable communication device.

FIG. 6 is a flowchart of another protection method for use in a portable communication device. In this embodiment, a specified command has been previously recorded into the storage unit 15 of the portable communication device 1. In the step S21, the portable communication device 1 is powered on and communicated with the message transmission system 2. In addition, the protective program is executed. Via the transceiver unit 11, the portable communication device 1 waits and receives a message, for example a short message (step S22). Next, the control unit 14 of the portable communication device 1 may determine whether the message comprises the specific command (step S23). If the message comprises the specific command, the control unit 14 performs a protection mechanism for preventing the important information contained in the portable communication device 1 from being revealed (step S25). Otherwise, the contents of the message will be shown on the display unit 13 (step S24).

Figure 7A:
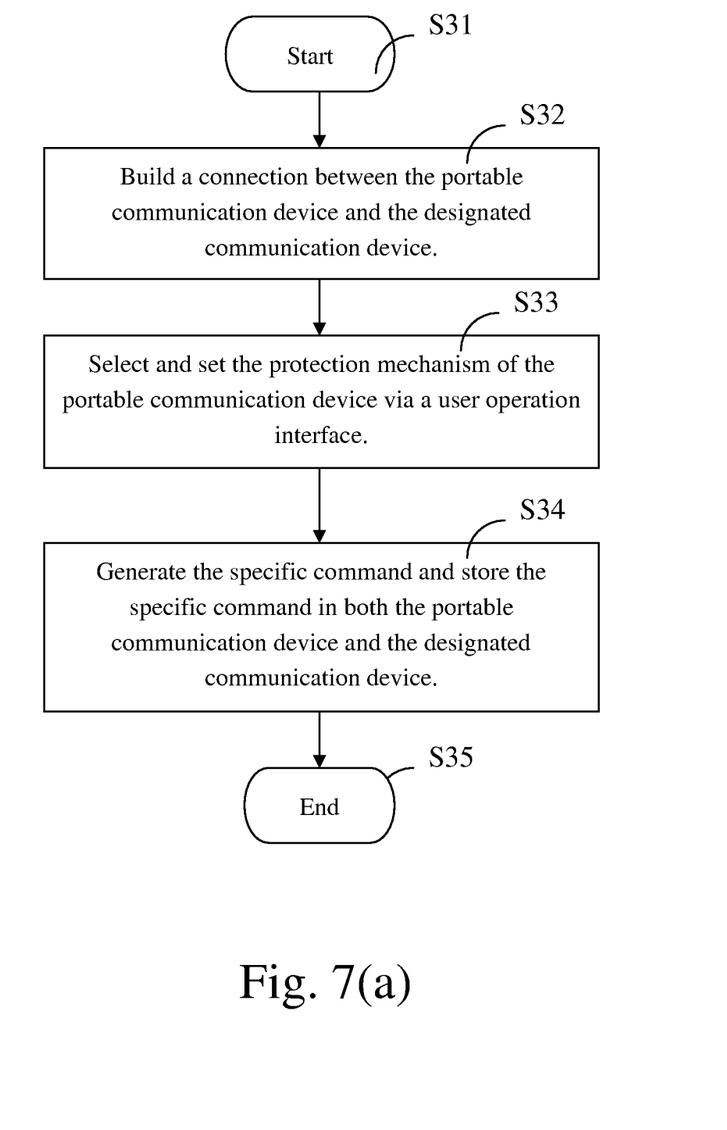
FIG. 7(a) is a flowchart illustrating the process of setting the protection mechanism.
Figure 7B:
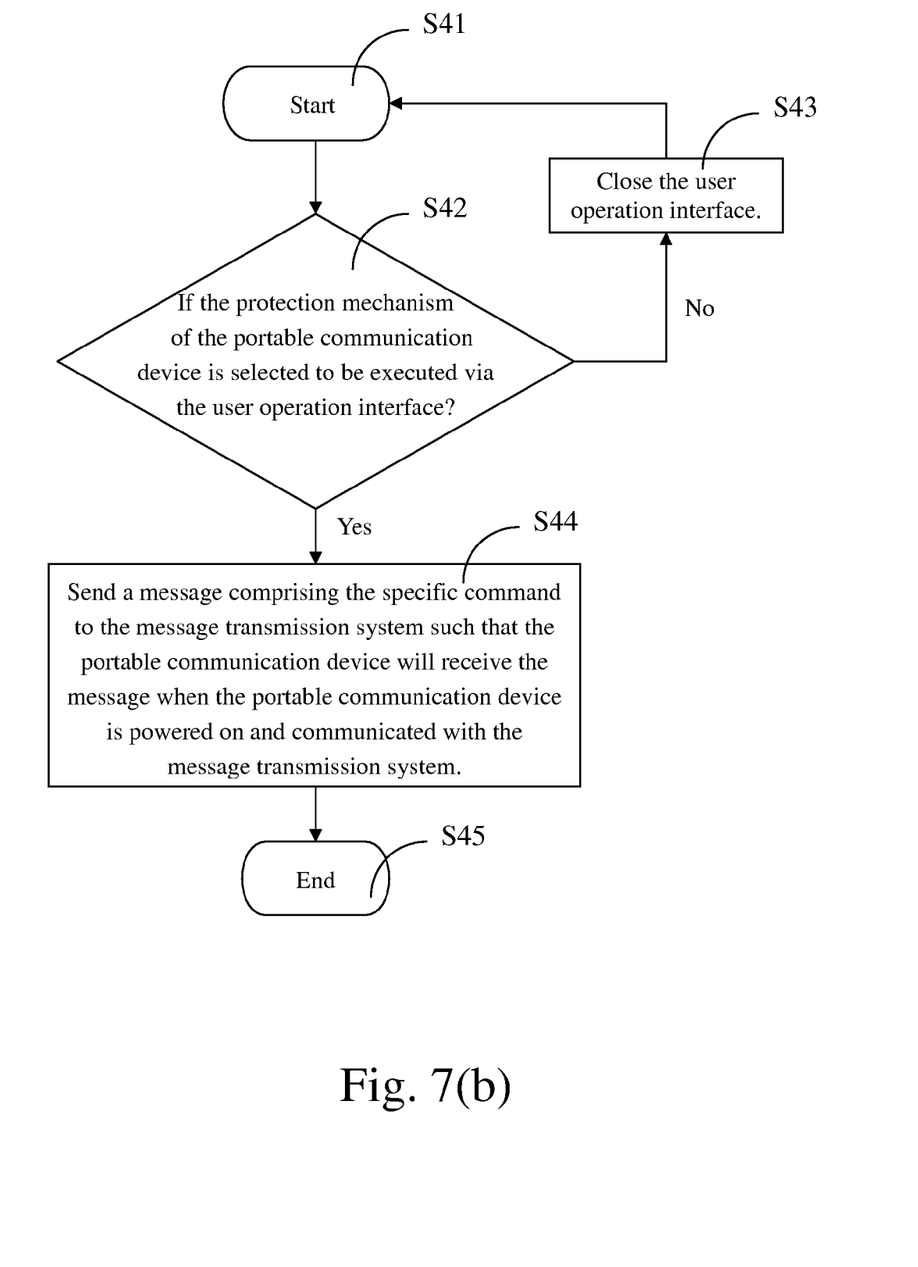
FIG. 7(b) is a flowchart illustrating the operation of the protection mechanism.

FIG. 7(*a*) is a flowchart illustrating the process of setting the protection mechanism, and FIG. 7(*b*) is a flowchart illustrating the operation of the protection mechanism. In the step S31, a protective program is executed in the designated communication device 3. When the designated communication device 3 is communicated with the portable communication device 1 (step S32), the user may select and set the protection mechanism of the portable communication device 1 via a user operation interface (step S33). Next, a first phone number and a first hardware identification serial number of the portable communication device 1 and a second phone number and a second hardware identification serial number of the designated communication device 3 are retrieved and calculated by the Message-Digest algorithm 5 (MD5), thereby generating the specific command, which is then stored into the portable communication device 1 and the designated communication device 3 (step S34). Afterwards, the process of setting the protection mechanism is finished (step S35).

After the protection mechanism is set, the protection mechanism of the portable communication device 1 will be implemented via the designated communication device 3. As shown in FIG. 7(*b*), the protective program is executed in the designated communication device 3 (step S41). Via the user operation interface, if the user executes the protection mechanism of the portable communication device 1 which has been previously stored therein the specified command (step S42), the designated communication device 3 will send a message comprising the specific command to the message transmission system 2 such that the portable communication device 1 will receive the message when the portable communication device 1 is powered on and communicated with the message transmission system 2 (step S44). Meanwhile, protection mechanisms are performed. Otherwise, if the user does not execute the protection mechanism, the user operation interface is closed (step S43).

In an embodiment, the present invention further relates to a storage medium storing therein a protective program. After the portable communication device 1 is communicated with the designated communication device 3, a first phone number and a first hardware identification serial number of the portable communication device 1 and a second phone number and a second hardware identification serial number of the designated communication device 3 are retrieved. According to the first phone number, the first hardware identification serial number, the second phone number and the second hardware identification serial number, the specific command is generated and then stored into the portable communication device 1 and the designated communication device 3. Next, the control unit 14 of the portable communication device 1 may determine whether the message sent from the designated communication device 3 comprises the specific command. If the message comprises the specific command, protection mechanisms are performed for protecting important information of the portable communication device 1 from being revealed if the portable communication device 1 is stolen or lost.

In a further embodiment, the present invention further relates to a storage medium storing therein a protective program. After the portable communication device 1 is communicated with the designated communication device 3, a first phone number and a first hardware identification serial number of the portable communication device 1 and a second phone number and a second hardware identification serial number of the designated communication device 3 are retrieved. According to the first phone number, the first hardware identification serial number, the second phone number and the second hardware identification serial number, the specific command is generated and then stored into the portable communication device 1 and the designated communication device 3. If the designated communication device 3 sends a message comprises the specific command to the message transmission system 2, the portable communication device 1 will receive the message when the portable communication device 1 is powered on and communicated with the message transmission system 2. Meanwhile, protection mechanisms are performed.

In the above embodiments, depending on the type of the protection mechanism, the means for generating the specified command is varied. For example, in a case that the protection mechanism is performed to delete the information previously stored in the portable communication device 1, the phone numbers and the hardware identification serial numbers of the portable communication device 1 and the designated communication device 3 are encoded as a first specific command by a first encoding means to be stored therein. Whereas, in another case that the protection mechanism is performed to lock the phone number of the portable communication device 1, the phone numbers and the hardware identification serial numbers of the portable communication device 1 and the designated communication device 3 are encoded as a second specific command by a second encoding means to be stored therein. In such manner, when the portable communication device is stolen or lost, the user can select which protection mechanism is performed to the portable communication device 1. Therefore, the portable communication device 1 and the designated communication device 3 can discriminate each other and perform the assigned protection mechanism when receive the requirement.

Figure 8:
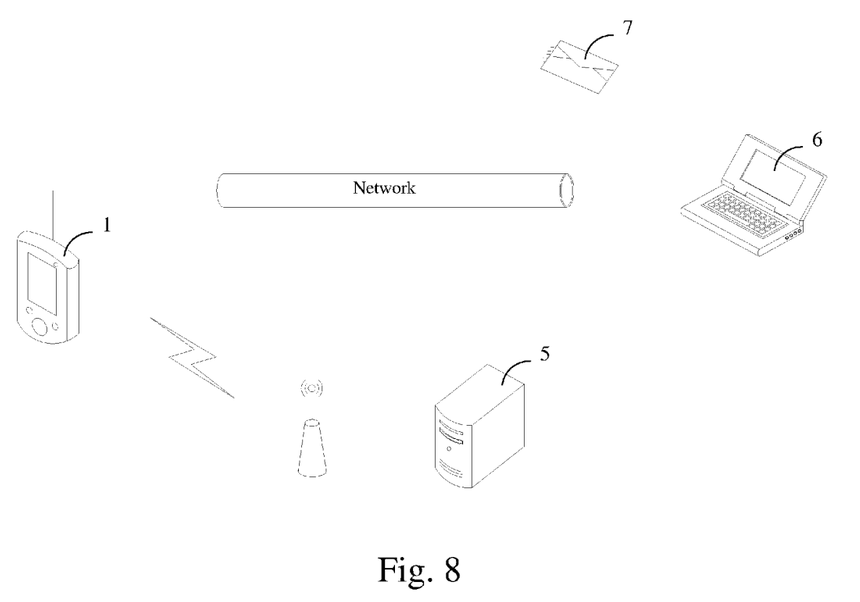
FIG. 8 is a schematic configuration of data security system according to another preferred embodiment of the present invention.

Referring to FIG. 8, a schematic configuration of data security system according to another preferred embodiment of the present invention is illustrated. The data security system of FIG. 8 comprises a portable communication device 1, a message transmission system 5 and a designated communication device 6. An exemplary portable communication device 1 includes a mobile phone, a personal digital assistant (PDA) and a notebook computer having a wireless communication module. There is an application program installed in the portable communication device 1 and this application program can be performed for providing email service. The application program can periodically and automatically wake up the portable communication device 1 so as to receive messages, for example emails or short messages, from the message transmission system 5. Some important or secret data such as address books, calendars, meeting record, electronic mails or personal video data have been stored in the portable communication device 1. An exemplary message transmission system 5 includes mail server. The message transmission system 5 is interconnected between the portable communication device 1 and the designated communication device 6. Through the message transmission system 5, the portable communication device 1 is communicated with the designated communication device 6, such that the designated communication device 6 may send a message 7, for example an email message or a short message, to the portable communication device 1. An example of the designated communication device 6 includes but is not limited to a mobile phone, a personal digital assistant (PDA), a notebook computer having a wireless communication module, a combination of a mobile phone and a notebook computer having IR transmission modules, or a notebook computer/desktop computer linked to a network. For example, if the designated communication device 6 is a notebook computer or desktop computer, the designated communication device 6 may be linked to the message transmission system 5 to send the message 7. For clarification, a notebook computer is shown in FIG. 8 as the designated communication device 6, which is linked to the message transmission system 5.

Figure 9:
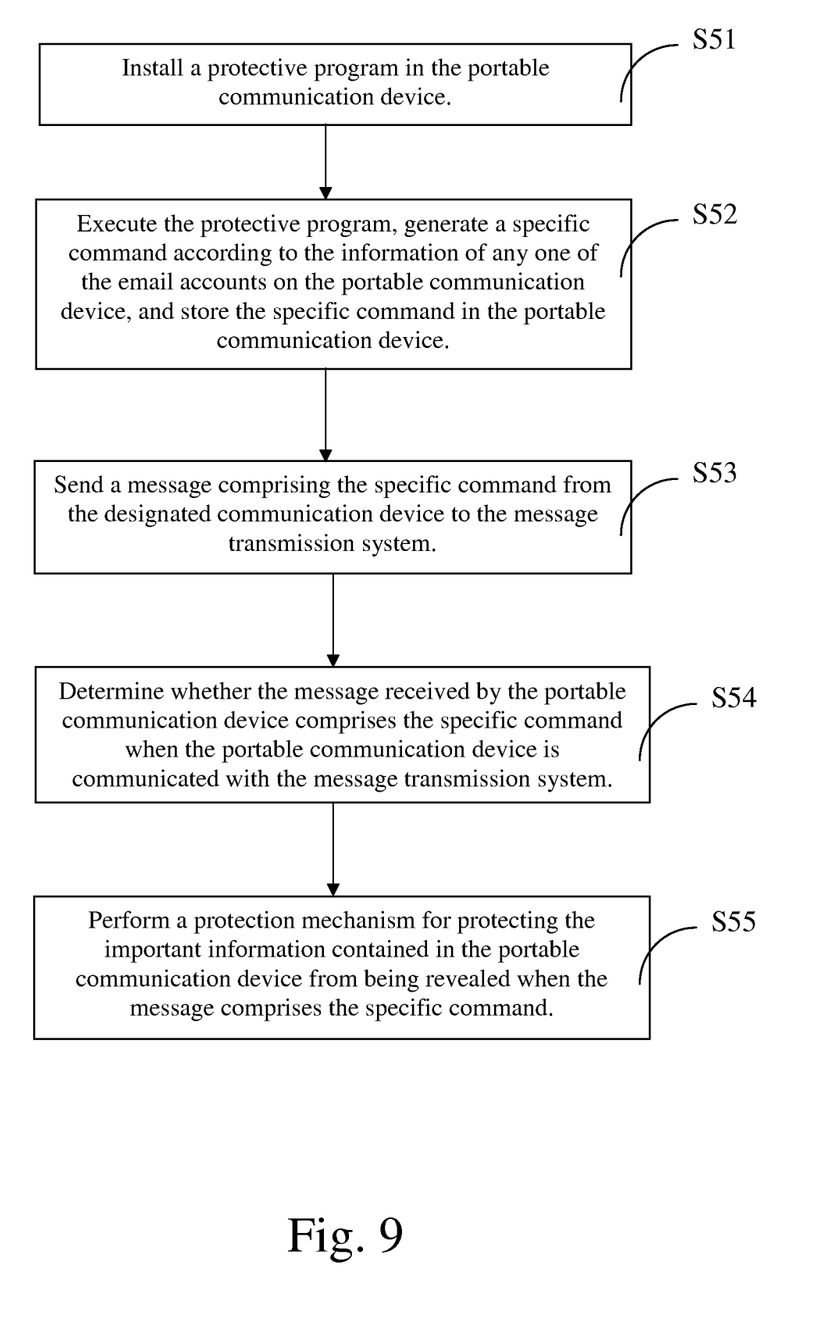
FIG. 9, is a flowchart of a protection method for use in a portable communication device.

Hereinafter, a flowchart of a protection method for use in a portable communication device will be illustrated with reference to FIG. 9 and also FIGS. 2 and 8. First of all, in the step S51, a protective program is installed in the storage unit 15 of the portable communication device 1. Alternatively, the portable communication device 1 has a built-in protective program. Next, in step S52, the protective program is executed and a user operation interface is shown on the display screen 13 of the portable communication device 1. Via the user operation interface of the portable communication device 1, the user can enter some email account information such as email address, email account ID, email account password and something else to make the portable communication device 1 be able to send and/or receive email to/from the message transmission system 5. Then, the user can set protection mechanisms by generating a specific command according to the information of any one of the email accounts on the portable communication device 1, and storing the specific command in the portable communication device 1. The protection mechanisms can be for example deleting information, locking phone number and/or delivering information associated with data security.

In step S53, when the portable communication device 1 is stolen or lost, a message 7, for example an email message or a short message, comprising the specific command can be generated and sent from the designated communication device 6 to the message transmission system 5. In this step, the user can write an email message or a short message which has a subject with the specific command to any one of the email accounts on the portable communication device 1 when the user wants to perform the protection mechanisms. Via the designated communication device 6, the user may decide whether the protection mechanisms should be done. If the user executes the protection mechanisms by writing an email message, the designated communication device 6 will send an email message comprising the specific command to the message transmission system 5. If the portable communication device 1 is powered on and communicated with the message transmission system 5, the portable communication device 1 may receive messages and determine whether any message comprises the specific command (step S54). If the specific command is contained in any message, the control unit 14 of the portable communication device 1 may perform the protection mechanism. The protection mechanism includes for example deletion of the secret and/or important information stored in the storage unit 15. These data are included in for example the address books, calendars, meeting record, electronic mails or video data files. It is of course that the protection mechanism may further include locking phone number, returning information, showing a warning text prompt or showing the way of communicating with the owner. Otherwise, if no specific command is contained in any message, the contents of the messages will be shown on the display screen 13.

An embodiment of generating the specific command will be illustrated as follows. For example, the portable communication device 1 has at least one email account. The specific command is composed of at least three strings "[Email address], [Password], [Command]", for example "xxxx@acer.com.tw, password, wipe". The string of [Email address] can be any one of email accounts which were set previously and correctly on the portable communication device 1. The string of [Password] is the password of the email account which email address is [Email address]. The string of [Command] is the predefined keyword which tells the portable communication device 1 to take what kind of protection mechanism, such as locking phone number, returning information, showing a warning text prompt or showing the way of communicating with the owner. According to the specific command, it is determined whether the protection mechanism applied between the portable communication device 1 and the designated communication device 6 should be performed or not.

Figure 10:
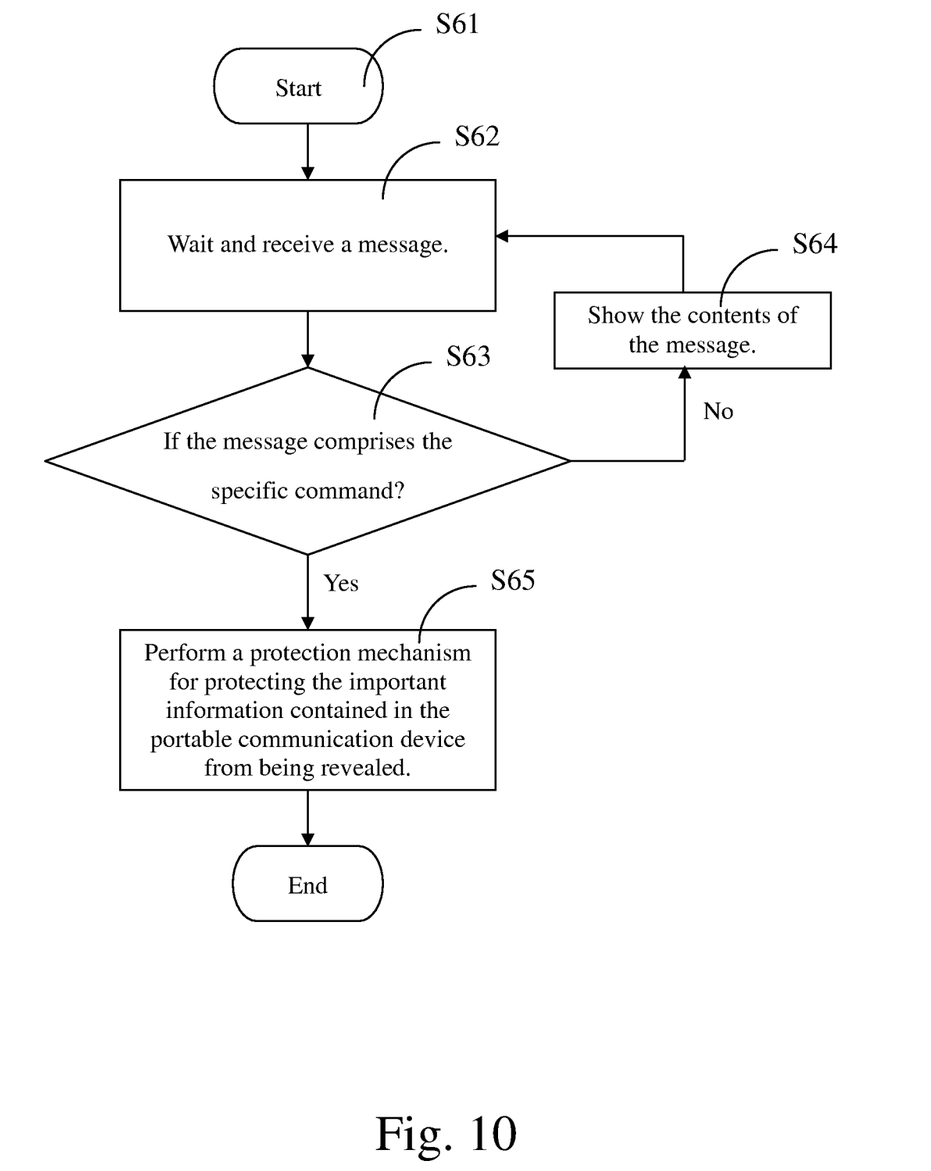
FIG. 10 is a flowchart of another protection method for use in a portable communication device.

FIG. 10 is a flowchart of another protection method for use in a portable communication device. In this embodiment, a specified command has been previously recorded into the storage unit 15 of the portable communication device 1. In the step S61, the portable communication device 1 is powered on and communicated with the message transmission system 5. In addition, the protective program is executed. In the Step S62, there is an application program installed in the portable communication device 1 and this application program can be performed for providing email service. The application program can periodically and automatically wake up the portable communication device 1 so as to receive email from the message transmission system 5. Via the transceiver unit 11, the portable communication device 1 waits and receives a message. Next, in the step S63, the control unit 14 of the portable communication device 1 may determine whether the message comprises the specific command. If the message comprises the specific command, the control unit 14 performs a protection mechanism for preventing the important information contained in the portable communication device 1 from being revealed (step S65). Otherwise, the contents of the message will be shown on the display unit 13 (step S64).

Figure 11:
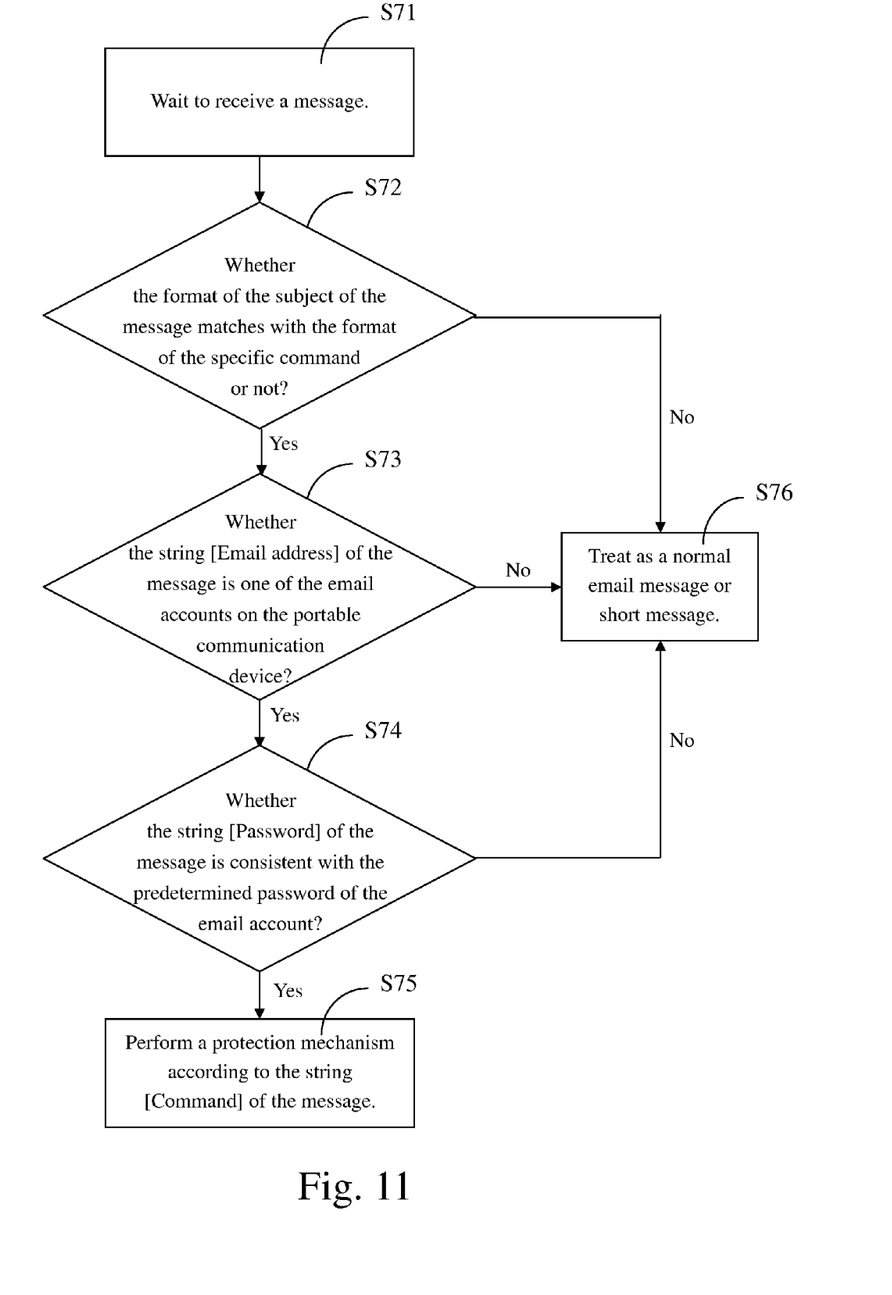
FIG. 11 is a flowchart illustrating the operation of the protection mechanism.

FIG. 11 is a flowchart illustrating the operation of the protection mechanism. In the step S71, the portable communication device 1 is waiting to receive a message 7, for example an email message or a short message, from the designated communication device 6. In the step S72, when a message 7 is received by the portable communication device 1, the control unit 14 of the portable communication device 1 will filter and determine whether the format of the subject of the message 7 matches with the format of the specific command or not? If the format of the subject of the message 7 doesn't match with the format of the specific command, the message 7 will be treated as a normal email message or short message (step S76). If the format of the subject of the message 7 matches with the format of the specific command, the control unit 14 of the portable communication device 1 will determine whether the string [Email address] of the message 7 is one of the email accounts on the portable communication device 1. If the string [Email address] of the message 7 isn't one of the email accounts on the portable communication device 1, the message 7 will be treated as a normal email message or short message (step S76). If the string [Email address] of the message 7 is one of the email accounts on the portable communication device 1, the control unit 14 of the portable communication device 1 will determine whether the string [Password] of the message 7 is consistent with the predetermined password of the email account (step S74). If the string [Password] of the message 7 is inconsistent with the predetermined password of the email account, the message 7 will be treated as a normal email message or short message (step S76). If the string [Password] of the message 7 is consistent with the predetermined password of the email account, the control unit 14 of the portable communication device 1 will perform a protection mechanism according to the string [Command] of the message 7 (step S75).

From the above description, the protection method used in a portable communication device is capable of preventing the important information contained in the portable communication device from being revealed. Since a specific command is stored into the portable communication device, the user may send a message comprising the specific command by the designated communication device to the portable communication device. When the message comprising the specific command is received by the portable communication device, protection mechanisms are performed for protecting important information of the portable communication device from being revealed if the portable communication device is stolen or lost.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A protection method used in a portable communication device, comprising the following steps:
    providing a first phone number and a first hardware identification serial number for said portable communication device;
    providing a designated communication device including a second phone number and a second hardware identification serial number;
    building a connection between said designated communication device and said portable communication device;
    generating a specific command according to said first phone number, said first hardware identification serial number, said second phone number and said second hardware identification serial number, wherein the generating step further comprises the sub-steps:
        encoding said first phone number and said first hardware identification serial number as a first command by Message-Digest algorithm 5 (MD5);
        encoding said second phone number and said second hardware identification serial number as a second command by Message-Digest algorithm 5 (MD5); and
        combining said first command with said second command into said specific command;
    storing said specific command into said portable communication device and said designated communication device;
    waiting for receiving a message by utilizing said portable communication device;

determining whether said received message comprises said specific command by comparing said specific command that had been previously stored in said portable communication device with content of said received message that is presently received; and performing a protection mechanism for protecting the information stored in said portable communication device when said message received by said portable communication device comprises said specific command.

2. The protection method according to claim 1 wherein said message is selected from a group consisting of a short message and an email message.

3. The protection method according to claim 2 wherein said short message is selected from a group consisting of a short message service (SMS) and a multimedia messaging service (MMS).

4. The protection method according to claim 1 wherein the waiting step further comprises the sub-steps:

generating and sending said message comprising said specific command from said designated communication device to a message transmission system; and receiving said message from said message transmission system when said portable communication device is powered on and connects to said message transmission system.

5. The protection method according to claim 4 wherein said designated communication device further includes a user interface for receiving an instruction, and said message comprising said specific command is sent in response to said instruction.

6. The protection method according to claim 1 further comprising a step of displaying the contents of said message on a display unit of said portable communication device when said message does not comprise said specific command.

7. The protection method according to claim 1 wherein said protection mechanism comprises of deleting the information stored in said portable communication device.

8. The protection method according to claim 1 wherein said protection mechanism comprises of locking said portable communication device.

9. The protection method according to claim 1 wherein said protection mechanism comprises of displaying a warning text for communicating with an owner of the portable communication device on a display unit of said portable communication device.

10. The protection method according to claim 1 wherein said protection mechanism comprises of transmitting the information stored in said portable communication device to a designated communication device.

11. A portable communication device with data protection function comprising:

a storing device for storing a specific command, said specific command is generated by building a connection between said portable communication device and said designated communication device, said portable communication device having a first phone number, a first hardware identification serial number, and a designated communication device having a second phone number, and a second hardware identification serial number, and generating the specific command according the first phone number, the first hardware identification serial number, the second phone number, and the second hardware identification serial number, wherein said specific command is a combination of a first command and a second command; said first command is encoded by said first phone number and said first hardware identification serial number by Message-Digest algorithm 5 (MD5); and said second command is encoded by said second phone number and said second hardware identification serial number by Message-Digest algorithm 5 (MD5);

a transceiver unit for receiving a message: and a control unit for determining whether said message received by said portable communication device comprises said specific command by comparing said specific command that had been previously stored in said storing device with content of said received message that is presently received, and performing a protection mechanism for protecting the information stored in said portable communication device when said message received by said transceiver unit comprises said specific command.

12. The portable communication device according to claim 11, wherein a message comprising said specific command is sent from said designated communication device to a message transmission system, and said portable communication device receives said message when said portable communication device is powered on and connects to said message transmission system.

13. The portable communication device according to claim 11 wherein said portable communication device comprises a email account and a predefine keyword, and said specific command is generated according to said email account and said predefined keyword.

14. The portable communication device according to claim 11 further comprising a display unit for displaying the contents of said message when said message does not comprise said specific command.

15. The portable communication device according to claim 11 wherein said protection mechanism comprises of deleting the information stored in said portable communication device.

16. The portable communication device according to claim 11 wherein said protection mechanism comprises of locking said portable communication device.

17. The portable communication device according to claim 11 wherein said protection mechanism comprises of displaying a warning text communicating with an owner of the portable communication device on a display unit of said portable communication device.

18. The portable communication device according to claim 11 wherein said protection mechanism comprises of transmitting the information stored in said portable communication device to a designated communication device.

19. The portable communication device according to claim 11 wherein said message is selected from a group consisting of a short message and an email message.

20. The portable communication device according to claim 19 wherein said short message is selected from a group consisting of a short message service (SMS) and a multimedia messaging service (MMS).

21. The portable communication device according to claim 11 wherein said portable communication device is selected from a group consisting of a mobile phone, a personal digital assistant (PDA) and a notebook computer with a wireless communication module.

22. The portable communication device according to claim 11, further comprising an input unit for receiving an input password, wherein a predetermined password has been recorded in said storage unit, and said control unit compares the input password with said predetermined password, wherein said protection mechanism is performed when said input password is inconsistent with said predetermined password.

23. A protection method used in a portable communication device, comprising the following steps:
- providing a first phone number and a first hardware identification serial number for said portable communication device;
- providing a designated communication device including a second phone number and a second hardware identification serial number;
- building a connection between said designated communication device and said portable communication device;
- generating a specific command according to said first phone number, said first hardware identification serial number, said second phone number and said second hardware identification serial number, and the generating step further comprises the sub-steps:
  - encoding said first phone number and said first hardware identification serial number as a first command by Message-Digest algorithm 5 (MD5);
  - encoding said second phone number and said second hardware identification serial number as a second command by Message-Digest algorithm 5 (MD5); and
  - combining said first command with said second command into said specific command;
- storing said specific command into said portable communication device and said designated communication device;
- waiting for receiving a message;
- determining whether said received message comprises said specific command by comparing said specific command previously stored in said portable communication device with content of said received message; and
- performing a protection mechanism for protecting the information stored in said portable communication device when said message comprises said specific command;

wherein the information stored in said portable communication device is not a command but other data than the command.

24. A portable communication device with data protection function comprising:
- a storing device for storing a specific command, said specific command is generated by building a connection between said portable communication device and said designated communication device, said portable communication device having a first phone number, a first hardware identification serial number, and a designated communication device having a second phone number, and a second hardware identification serial number, and generating the specific command according the first phone number, the first hardware identification serial number, the second phone number, and the second hardware identification serial number;
- a transceiver unit for receiving a message: and
- a control unit for determining whether said message received by said portable communication device comprises said specific command by comparing said specific command previously stored in said storing device with content of said received message, and performing a protection mechanism for protecting the information stored in said portable communication device when said message comprises said specific command, wherein the information stored in said portable communication device is not a command but other data than the command;
- wherein said specific command is a combination of a first command and a second command; said first command is encoded by said first phone number and said first hardware identification serial number by Message-Digest algorithm 5 (MD5); and said second command is encoded by said second phone number and said second hardware identification serial number by Message-Digest algorithm 5 (MD5).

* * * * *